Patented Mar. 1, 1949

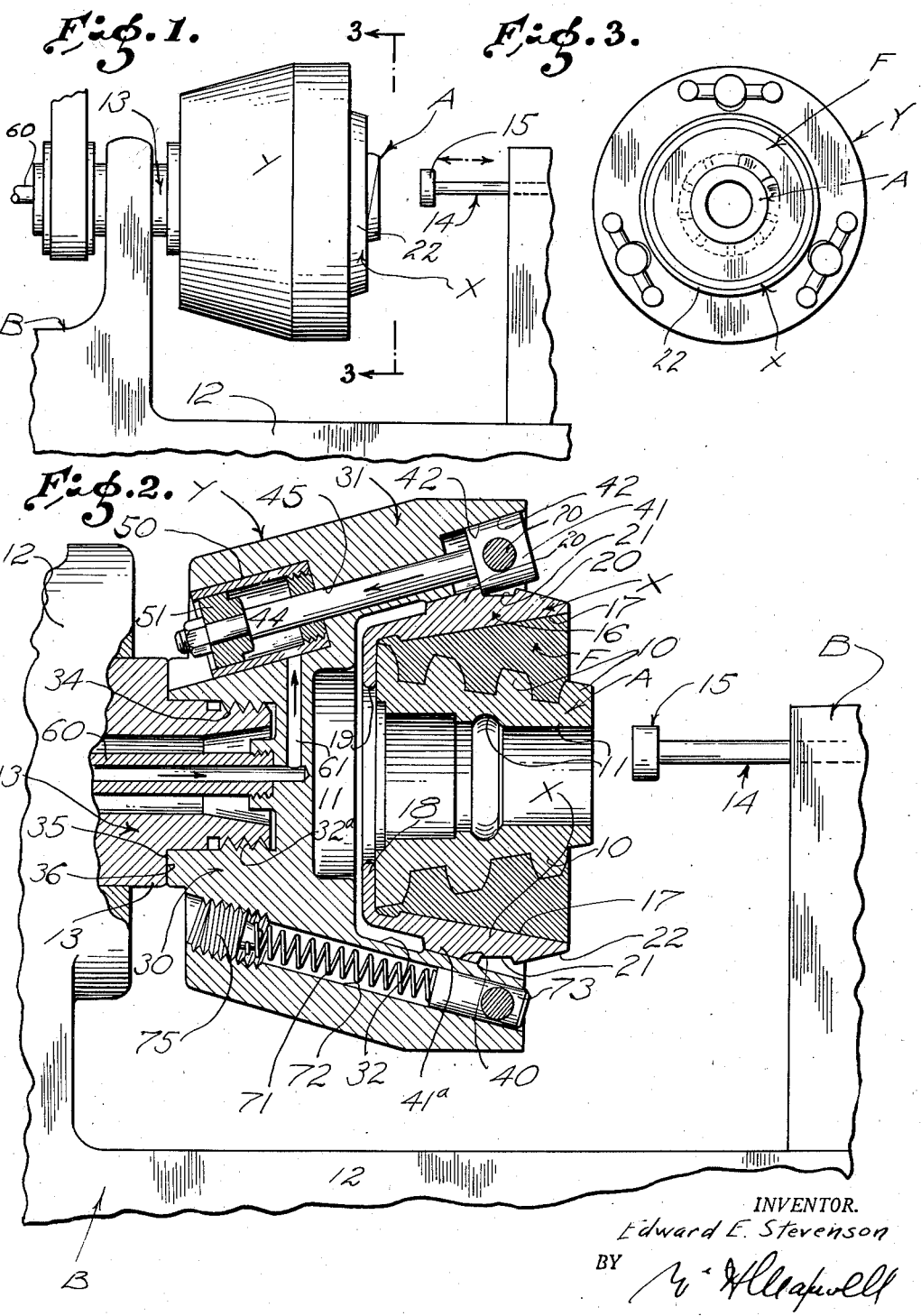

2,463,064

UNITED STATES PATENT OFFICE 2,463,064

WORK HANDLING DEVICE

Edward E. Stevenson, Whittier, Calif., assignor to Globe Oil Tools Company, Los Nietos, Calif., a corporation of California Application May 22, 1944, Serial No. 536,753

10 Claims. (Cl. 279—4)

This invention relates to a device or mechanism for handling work in a machine, or the like, and has particular reference to a mechanism for handling work in a machine such as a lathe or a grinder. A general object of the invention is to provide such a mechanism which is simple, practical and accurate and which will effectively handle work of a character difficult or impractical to handle by ordinary methods or mechanisms.

There are various articles or units of work that require operations such as turning or grinding or milling and which are of a form, construction, or character that make it exceedingly difficult and highly impractical to handle them in the usual machines or with the usual equipment. The usual chuck employed for gripping and holding work in a machine involves a plurality of jaws and works satisfactorily when the work to be engaged presents turned surfaces or regularly shaped, true parts that can be accurately gripped in a predetermined manner. When the work to be handled varies in size or shape or contour from one piece to the next, it requires the exercise of great skill and the expenditure of considerable time to individually mount each piece if uniformity of mounting is to be attained.

As an example of a unit of work presenting a problem such as my invention is designed to handle, I refer to a cutter such as is used in earth boring tools. A typical cutter of this kind is generally in the form of a truncated cone having a central longitudinal opening through it requiring accurate finishing operations to be performed from both ends. The exterior of the cone carries irregularly arranged or irregular teeth making it difficult, if not wholly impractical, to attempt to hold the cutter from its exterior.

A general object of the present invention is to provide a mechanism whereby units of work such as I have referred to above can be effectively and accurately mounted in a machine or in different machines, not only for the performance of work while they are held in one position, but so that they can be operated on from various positions. I may accurately and quickly mount the work in machines such as lathes or grinders and can mount it in one machine after another as the operations require.

Another object of my invention is to provide a mechanism of the general character referred to which involves but few parts all of which are simple and sturdy of form and construction. The mechanism of the present invention supports work through cooperation of finished or accurately formed parts which are large and so disposed as to minimize discrepancies or inaccuracies such as occur in machines, generally.

Another object of my invention is to provide a mechanism of the general character referred to which includes, generally, two elements, one a work holder to which the work is applied, and the other a head to be mounted on and operated by a machine. The construction of the present invention is such as to allow the work holder to be readily and accurately applied to the head so that it is securely gripped thereby so that the work in the holder is in position to be operated on by the machine.

Another object of my invention is to provide a mechanism of the character referred to wherein a single work holder carrying a unit of work is applicable to the head in different positions so that the work is supported in the machine in different positions, or so different parts of it can be readily reached or acted upon.

The various objects and features of my invention will be fully understood from the following detailed description of a typical preferred form and application of the invention, throughout which description reference is made to the accompanying drawings, in which:

Fig. 1 is a somewhat diagrammatic view of a simple machine showing the mechanism of the present invention applied thereto so that the head of the mechanism is carried by the machine and supports the holder so that a unit of work is in position to be acted upon by the machine. Fig. 2 is an enlarged longitudinal detailed sectional view of the construction provided by my invention showing the work holder with a unit of work therein mounted in operating position in the head of the mechanism which head is mounted in the machine and the machine is in position to operate on the work, and Fig. 3 is a view taken as indicated by line 3—3 on Fig. 1.

The mechanism of the present invention is operable to mount a unit of work A in a machine B and involves, generally, a work holder X to which the work A is fixed and a head Y applied to the machine to operate as a part thereof.

The unit of work A shown in the drawings as a typical part on which an operation or operations are to be performed is a cutter for use in a well drilling bit. The particular cutter illustrated is frusto-conical in form and has a plurality of cutting teeth 10 projecting from its outer surface, the teeth being somewhat irregular in form and being arranged or located so that the cutter presents a difficult object to be handled in an ordinary chuck, or the like. The cutter has a central longitudinal opening with surfaces 11 of various sizes and shapes required to be finished. Certain of these surfaces are readily accessible from one end of the cutter while others are readily accessible from the other end of the cutter. In the case of the cutter illustrated it is advantageous to handle it so that it can be mounted in the machine B so that its ends are successively presented to the working or cutting element of the machine.

The machine B may, in practice, be any suitable machine or unit of apparatus for handling the mechanism of the present invention so that the desired operations are performed upon the work. In the drawings I have indicated, generally, a grinding machine having a frame 12 supporting a work carrying spindle 13 for rotation and supporting a cutter carrying spindle 14 for rotation and reciprocation. I have shown the head Y of my mechanism supported on the spindle 13 so that work A in a holder X carried by the head is in position to be engaged by a grinding wheel 15, or the like, operated by the spindle 14. It is to be understood that I have referred to a grinding machine merely for purpose of example and have shown merely a simple or general arrangement of parts such as may be used. In practice the details of the parts of my mechanism and the manner in which they are mounted may be varied depending upon the particular work being handled or upon the particular machine in which they are to operate.

The work holder X provided by my invention is a unit completely separable or detachable from the head Y and it involves, generally, a tubular body 16 in which the unit of work A is mounted. The holder X is adapted to be mounted in different positions in the head Y. For example in the case illustrated it is reversible and can be turned end for end so that either end is faced in the direction of or is presented to the cutting part of the machine. Where the holder X is a simple tubular member it is most advantageous to make it simply reversible end for end as I have illustrated in the drawings.

The holder X is designed to receive and firmly support the work A. In the preferred form the opening 17 through the body 16 of the holder is tapered so that the work can be readily inserted in the body from one end to engage an inwardly projecting flange 18 provided at the other end of the body. The flange 18 is of limited extent and merely serves as a stop or seat for one end of the work, the opening 19 through the flange being sufficiently large to allow free access to the interior of the work A when the flanged end of the holder is presented to the cutter of the machine.

In the preferred form of the invention I mount the work A in the body 16 of the holder X by casting a filler F between the holder and work. I prefer to form the unit of the holder X, work A and filler F by the method and in the apparatus which are the subject of my co-pending application entitled "Method of mounting work in a holder," filed May 22, 1944, Serial No. 536,754. When the work is mounted in the holder in accordance with the teaching of my co-pending application it is held solidly or firmly and in a fixed predetermined position relative to the holder, the opening through the cutter being concentric with the axis of the holder. As I set forth in my said co-pending application the filler F is preferably a metal solid at normal temperatures but subject to being melted at temperatures around 180° F. The metal of the filler F may be an alloy of bismuth, lead, cadmium and tin, in which case the work is solidly held in the holder so that for all practical purposes the holder X, the work A and the filler F are one continuous or integral unit. By adding mercury to the alloy the melting point can be lowered. In any particular case I will use a filler having a melting point low enough so that the filler employed as I provide does not draw the temper or in any way injure or even discolor the work being handled.

By my invention I provide parts on the exterior of the holder body 16 whereby the holder can be mounted in the head Y from either end and so that it is supported in the head with its longitudinal or central axis concentric with the axis of the head. In accordance with the preferred construction I provide spaced circumferential ribs 20 on the exterior of the body 16 and I space the ribs apart longitudinally of the body so there is a channel 21 between them and I provide a tapered, finished face 22 on the exterior of each rib. The finished faces 22 of the two ribs are pitched in opposite directions and so that the large ends of the two ribs oppose each other in forming the channel 21. The finished surfaces 22 of the two ribs are alike or identical as to size and pitch so that either one can be fitted into the head as will be hereinafter described. The broad principles of the invention contemplate one or more finished surfaces on the holder to facilitate its mounting in a head or the like, and it is not necessary that there be parts specifically in the form of ribs.

The head X of the mechanism involves, generally, a hub portion 30 by which the head is applied to the machine B and an annular axially projecting socket portion 31 forming a socket 32 for the reception of the holder X. The parts 30 and 31 are formed integrally and in any particular case are proportioned to accommodate the machine to which the mechanism is applied, and the particular size and shape of work holder X to be employed.

The hub 30 is designed for application to the threaded end 32ª of the machine spindle 13. I have shown a threaded socket 34 in the hub concentric with the axis of the head to receive the threaded end 32ª of the spindle so that the end face 35 of the hub seats on and is aligned by the shoulder 36 of the spindle. This construction provides a simple, accurate means for applying the head Y to the spindle 13 of the machine so that it operates concentric therewith.

The socket portion 31 of the head Y projects outwardly and axially from the hub 30 so that the socket opening 32 within the portion 31 is sufficiently large to adequately accommodate the holder X.

In accordance with my invention I provide a tapered annular seat 40 in the socket portion 31 or on a rib 41ª projection somewhat from the wall of the socket 32 which seat 40 corresponds in size and taper to the finished surfaces 22 on the exterior of the work holder. The parts are proportioned so that when the work holder X is arranged in the head Y from either direction, that is, so that either of its ends enters the socket 32, one of the finished tapered surfaces 22 on the exterior of the work holder will engage and accurately seat on the seating surface 40 within the head. The manner in which the parts cooperate is clearly illustrated in Fig. 2 of the drawings.

My invention provides means for retaining the work holder X in the head Y with the tapered faces in seated engagement as hereinabove described. The particular form of retaining means illustrated in the drawings includes a plurality of retainers 41 carried by the head Y so that they are operable to engage and hold the holder X. I prefer to provide several retainers 41 spaced around the outer or mouth portion of the socket 31 so that the holder X is engaged and held at several circumferentially spaced points.

In the case illustrated each retainer 41 is in the form of a block slidable in a guide way 42 formed parallel with the surface or pitch of the socket wall and the retainers are shaped and proportioned so that they are shiftable or movable inwardly in the guideways 42 so that they engage in the channel 21 in the exterior of the holder X to contact the large end of the ribs 20 of the holder which is engaged on the seating surface 40 in the head. When the retainers 41 are moved outwardly in the guideways 40 they are clear of the channels 21 and allow free movement of the holder X in and out of the head Y.

In the construction shown in the drawings each retainer 41 is carried on a stem 44 slidably carried in an opening 45 formed in the head portion 31 parallel with the guideway 42 which guides the retainer.

I provide means for actuating or moving the retainers 41 inwardly into clamping engagement with the holder X so that the holder is held in the head Y during operation of the machine. In the preferred arrangement a cylinder 50 is provided for each retainer 41 and a piston 51 is attached to the stem 44 carrying the retainer so that it operates in the cylinder 50. I provide means for introducing fluid under pressure into the cylinder 50 to act on the piston 51 so that the stem is moved inwardly as indicated by the arrow in Fig. 2. In practice I may supply fluid pressure to the several cylinders 50 in any suitable manner. In the particular case illustrated I have shown the spindle 13 as a hollow spindle and have shown a fluid supply line 60 entering the head Y through the hollow spindle 13. The supply line 60 communicates with radial ports 61 which carry the fluid to the cylinders 50.

I prefer to provide the mechanism with means for releasing the retainers 41 and for normally yieldingly holding them in the released position. This means may involve springs arranged to act so that they normally yieldingly hold the retaining members 41 out in the guideways 42. In the particular construction illustrated each retaining member 41 is equipped with a cross-arm 70 and springs 71 are carried in openings 72 provided in the head portion 31 so that they act on the outer end portions of the cross arms to urge them outwardly. In the particular case illustrated blocks 73 are connected by the outer ends of the cross-arms and slide in the openings 72 presenting abutments against which the springs 71 operate. The openings 72 for the springs of each retaining member 41 are formed parallel with the stem 44 of that member. The inner or fixed ends of the springs 71 are supported by plugs 75 screw threaded into the openings 72. The plugs allow for adjusting the pressure on the springs and for removing or replacing the springs, as circumstances require.

In operating the mechanism of the present invention the head Y is applied to the spindle 13 of the machine B as shown in the drawings. The work holder X with the work A held therein, as by a filler F, is then arranged in the head Y so that the end of the work A to be operated on initially is out or exposed to the member 15 on the spindle 14 of the machine. The fluid pressure is then applied to the cylinders 50 causing the stems 44 to move inwardly with the result that the retainers 41 engage in the channel 21 and contact the rib 20 which is arranged on the seat 40. As a result of this operation the holder X is firmly and accurately held in the head Y and while the machine is operated the fluid pressure is maintained in the cylinders 50 holding the holder X tight in the head. When the machine has been operated so that the desired work has been performed on the work A the machine is stopped and the pressure is relieved from the cylinders 50 so that the springs 71 move the retaining members outwardly thus disengaging them from the channel 21. The work holder X is then free to be withdrawn from the head Y and, if desired, turned end for end and replaced in the head or can be placed in a head on another machine so that the other or opposite end of the work A is in position to be engaged by the member 15 on the spindle 14 of the machine. When the work holder has thus been reversed and re-arranged in the head Y pressure can be applied retaining the holder in the head and the machine operated as desired. Following the second operation when pressure is released from the cylinders 50 the work holder X is released and is free to be withdrawn from the head Y. To disengage the work A from the holder X it is merely necessary to supply sufficient heat to melt the filler F from between the holder and the work.

Having described only a typical preferred form and application of my invention, I do not wish to be limited or restricted by the details herein set forth, but wish to reserve to myself any variations or modifications that may appear to those skilled in the art or fall within the scope of the following claims.

Having described my invention, I claim:

1. A work holder including a rigid annular unitary open ended body the interior of which receives the work, a rigid filler fitting tight in the body and conforming to the work, and oppositely disposed beveled parts on the exterior of the body whereby the holder can be mounted in opposite positions in a machine.

2. A work holder including a rigid annular unitary open ended body the interior of which receives the work with clearance, a rigid filler fitting tight in the body and conforming to the work, and axially spaced circumferential ribs on the exterior of the body, the outer surfaces of the ribs being beveled in opposite directions axially of the body.

3. A head for mounting a work holder having an axially facing shoulder at its exterior including a mounting hub, an axially projecting socket carried by the hub to receive the holder, and means for releasably retaining the holder in the socket including retaining members carried by the hub at circumferentially spaced points to engage the shoulder of the holder, and fluid pressure actuated means for operating the members.

4. A head for mounting a work holder having opposite axially facing shoulders at its exterior including a mounting hub, an axially projecting socket carried by the hub to receive the holder, and means for releasably retaining the holder in the socket including retaining members carried by the hub at circumferentially spaced points to engage the holder, means normally yieldingly holding the members inactive, and fluid pressure actuated means for moving the members to active position.

5. In combination, a hollow rigid work holder having spaced beveled ribs on its exterior, a head for operation by a machine and having a socket part with a beveled internal surface for supporting the holder through either of said ribs, and an axially reciprocating retainer carried by the head entering between the ribs and engaging the inner end of one of the ribs to releasably retain the holder in the socket part.

6. In combination, a work holder having spaced beveled ribs on its exterior, a head for operation by a machine and having a socket part with a beveled internal surface for supporting the holder through either of said ribs, a retainer carried by the head operable to engage between the ribs to releasably retain the holder in the socket part, and fluid pressure actuated means for operating the retainer to engage the holder.

7. In combination, a work holder having spaced beveled ribs on its exterior, a head for operation by a machine and having a socket part with a beveled internal surface for supporting the holder through either of said ribs, a retainer carried by the head operable to engage between the ribs to releasably retain the holder in the socket part, means normally yieldingly holding the retainer disengaged from the holder, and fluid pressure actuated means for operating the retainer to engage the holder.

8. A head for mounting a rigid work holder including a rigid unit having a mounting hub, an axially projecting socket projecting from the hub and having an outwardly diverging socket opening with a finished holder-receiving seat intermediate its ends to be engaged by the holder, and means for releasably retaining the holder in the socket including reciprocating retaining members carried by the unit at circumferentially spaced points and movable lengthwise of the head to engage the holder.

9. In combination, a rigid hollow body with a tapered work receiving socket and a tapered face on its exterior concentric with the socket, a metal filler tight in the socket and having holding engagement with work in the socket, and a body carrying head for operation by a machine and having a tapered socket part with a beveled internal surface supporting the body through its said tapered face.

10. In combination, a rigid hollow body with a tapered work receiving socket and a tapered face on its exterior concentric with the socket, a metal filler tight in the socket and having holding engagement with work in the socket, a body carrying head for operation by a machine and having a tapered socket part with a beveled internal surface to support the holder through its said face, and means releasably retaining the body in the socket of the head with said face in engagement with said surface.

EDWARD E. STEVENSON.

REFERENCES CITED

The following references are of record in the file of this patent:

UNITED STATES PATENTS

| Number | Name | Date |
| --- | --- | --- |
| 709,526 | Taylor et al. | Sept. 23, 1902 |
| 995,537 | Hertner et al. | June 30, 1911 |
| 1,295,994 | Lavoie | Mar. 4, 1919 |
| 1,331,030 | Ryan | Feb. 17, 1920 |
| 1,551,342 | Steenstrup | Aug. 25, 1925 |
| 1,618,998 | Redinger | Mar. 1, 1927 |
| 1,702,132 | Redinger | Feb. 12, 1929 |
| 1,714,555 | Gallimore et al. | May 28, 1929 |
| 1,740,542 | Gallimore et al. | Dec. 24, 1929 |
| 1,929,285 | Muller | Oct. 3, 1933 |